Sept. 1, 1964
S. A. EDGAR
3,147,186
STABLE COCCIDIOSIS IMMUNIZATION
Filed April 3, 1961
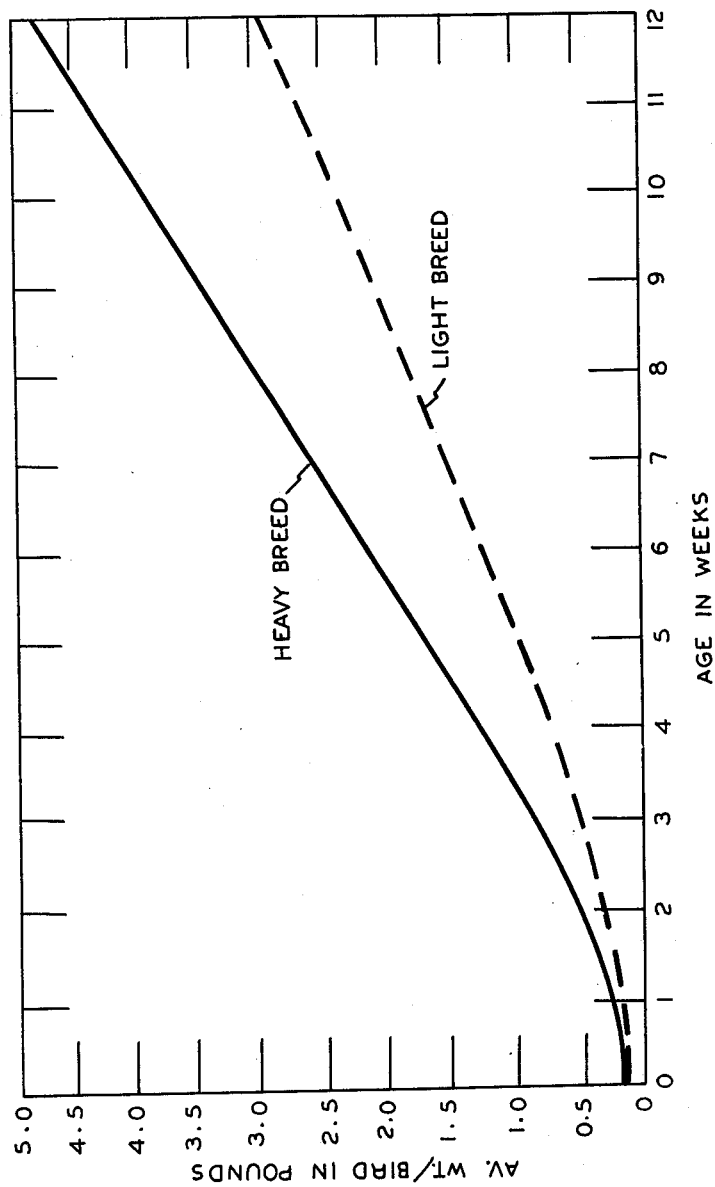
INVENTOR.
SAMUEL ALLEN EDGAR
BY B. Woodrow Wyatt
Agent United States Patent Office 3,147,186
Patented Sept. 1, 1964

3,147,186
STABLE COCCIDIOSIS IMMUNIZATION
Samuel Allen Edgar, Auburn, Ala., assignor to Auburn Research Foundation, Auburn, Ala., a corporation of Alabama
Filed Apr. 3, 1961, Ser. No. 100,181
7 Claims. (Cl. 167—78)

This invention relates to immunization of chickens against cecal coccidiosis. More particularly, this invention relates to (a) a novel and practical method of obtaining viable sporulated oocysts of *Eimeria tenella* as storage-stable inocula obtainable therefrom for immunization of chickens against cecal coccidiosis, and to (b) the use of such inocula in said immunization.

Cecal or bloody coccidiosis in chickens, which is caused by the microscopic protozoan parasite *Eimeria tenella*, is one of the most widespread and destructive diseases encountered in commercial poultry raising. This disease occurs throughout the United States, and it has been estimated that from 5 percent to 20 percent of all young chickens die as a result of cecal coccidiosis despite efforts to control this disease, the mortality rate being unusually high among chickens during the first six to eight weeks of life. Moreover, further economic losses result from the weak and emaciated conditions of many of the survivors of sublethal infections of the disease. As a consequence, numerous attempts have been made in the past to develop means for effectively combatting and controlling cecal coccidiosis; for instance, see the discussions by E. R. Becker in "Diseases of Poultry," first edition, edited by H. E. Biester and Louis Devries, The Collegiate Press, Ames, Iowa, 1945, pages 733–761, and fourth edition, edited by H. Biester and L. R. Schwarte, The Iowa State University Press, Ames, Iowa, 1959, pages 828–858. The prior methods which have been tried have included, for example, rearing the chickens on wire, use of stringent sanitation measures, medication with chemotherapeutic drugs, subcutaneous injection of antiserum, intramuscular injection of vaccine, treatment with oral vaccines, and combinations of two or more such procedures. However, owing to one or more drawbacks, none of the previous attempest to solve the problem of cecal coccidiosis in commercial chicken flocks has been fully satisfactory.

Under natural conditions, a chicken recovering from a severe infection of *Eimeria tenella* usually has a high degree of immunity against cecal coccidiosis, and repeated light infections also allow the bird to develop resistance by the immunization process. However, the process of natural infection by spontaneous exposure has proved highly unsatisfactory as a means for protecting chicken flocks, since only a few birds at a time become infected and serious outbreaks of severe infection may suddenly appear in the flock members having little or no immunity. To avoid the uncertainties of natural infection, it has long been recognized that it would be desirable if immunity to cecal coccidiosis could be produced in chicken flocks by some sort of deliberate and carefully controlled exposure to sporulated oocysts of *Eimeria tenella*. Prior to the instant invention, however, all efforts to this end have not resulted in a process which can be applied in a practical, dependable, and economical way to the commercial poultry industry. The chief reason for these failures was that the inocula produced by previously available procedures contained unknown or low or variable numbers of viable sporulated oocysts of *Eimeria tenella*, so that production of a critically controlled infection in chicken flocks was not obtained. Erratic and unreliable results were obtained by the use of such inocula, and severe losses of chickens sometimes occurred during the attempted immunization procedure. Thus, for example, in one suggested procedure, inocula administered orally to chicken flocks in doses of less than 1000 oocysts of *Eimeria tenella* per bird failed to give satisfactory immunization, apparently because some chickens received no, or an insufficient number of, viable sporulated oocysts in the dose; and, moreover, no difference between immunization effects produced by oral inocula containing 1000 oocysts and 100,000 oocysts, respectively, could be detected. As a further consideration, prior to the present invention no method was available for the production of inocula of viable sporulated oocysts of *Eimeria tenella* having sufficiently satisfactory storage stability to permit practical commercial utilization thereof.

It is therefore a primary object of the instant invention to provide practical and effective means for combatting cecal coccidiosis in chickens, and in particular to provide means whereby chicken flocks can be effectively immunized against this disease.

One aspect of the instant invention resides in the concept of the following method which provides, for the first time, means for practical commercial production of viable sporulated oocysts of *Eimeria tenella* in a form readily adapted to use in appropriate dosage in infective inocula for oral administration to chickens to immunize them against cecal coccidiosis. My new method comprises the steps of: infecting a healthy, disease-free chicken one day to twelve weeks of age by inoculation with an oral dose of viable sporulated oocysts of *Eimeria tenella* in which the number of said viable sporulated oocysts is approximately 100–300 for a chicken one day old and is increased with increasing age and weight of the chicken to a maximum of approximately 40,000 for a chicken twelve weeks old and weighing approximately five pounds; harvesting during the period from 144 hours to 288 hours after the inoculation the oocysts of *Eimeria tenella* produced by the infection by periodically collecting the moist fresh cecal droppings from the infected chicken over a period of up to 96 hours beginning 144–192 hours after the inoculation, and optionally harvesting also the oocysts from the cecal pouches by sacrificing the chicken 156–288 hours after the inoculation, removing and opening the cecal pouches of the chicken, and collecting the contents of said cecal pouches; mixing the harvested oocysts, within approximately four hours after collection thereof, with a 1–4 percent aqueous potassium dichromate solution, removing coarse insoluble particles of debris from the suspensions of oocysts thus obtained, and then aerating the oocysts, beginning within approximately eighteen hours after their collection, in a 1–4 percent aqueous solution of potassium dichromate at a temperature in the approximate range 19–37° C., thereby causing sporulation of the oocysts; and washing the sporulated oocysts thus obtained with a 1–4 percent aqueous solution of potassium dichromate. When extended storage is necessary or desirable, the sporulated oocysts of *Eimeria tenella* obtained by the foregoing method are suspended in a 1–4 percent aqueous potassium dichromate solution and stored under refrigeration, but above the freezing point, in partially-filled, tightly-sealed containers.

Before describing in greater detail the production method and immunization process of the instant invention, it will be helpful to an understanding thereof to consider the course of infection in coccidiosis caused by *Eimeria tenella* in chickens.

DEVELOPMENT OF THE INFECTION IN COCCIDIOSIS CAUSED BY *EIMERIA TENELLA*

The chicken becomes infected when the parasite is ingested in the form of sporulated oocysts of *Eimeria tenella*. These infective oocysts have been formed by the passage, and subsequent sporulation of, unsporulated oocysts in the droppings of infected birds. Each sporulated infective oocyst contains four sporocysts and each sporocyst contains two sporozoites. In the duodenum the sporulated oocysts rupture, freeing the sporocysts and then the sporozoites excyst, that is, the sporozoites swim through a tiny opening in the end of the sporocyst and pass down the digestive tract. Some of the sporozoites eventually reach the cecal pouches where they enter epithelial cells of the mucosa, deep in the crypts between the villi. Each motile sporozoite may enter a separate epithelial cell where it grows rapidly and develops into a first generation schizont. Inside each schizont many first generation merozoites develop. At this stage, the parasitized epithelial cell maintains its position in the mucosa of the pouch but becomes distorted, because of extreme growth and resulting pressure of the schizont with its enclosed merozoites, and this distortion in turn causes distortion of adjacent epithelial cells.

About 66 to 72 hours after the infection starts, the first generation merozoites rupture from the first generation schizonts into the lumens of the cecal pouches. These merozoites enter new epithelial cells which line the sides of the villi. Each merozoite usually enters a separate epithelial cell and here the first generation merozoites start to develop and grow rapidly into second generation schizonts. In this instance the parasitized epithelial cells become migratory and move into the area (lamina propria) below the epithelium. These parasites within the altered epithelial cells grow rapidly and eventually, within 36 to 48 hours, each contains many second generation merozoites. The growth of second generation schizonts with their merozoites is so prolific at times that they invade tissue beneath the muscularis mucosae and throughout the connective tissue of the mucosa.

At about this stage of the infection, when the second generation schizonts are ripe and have grown tremendously, the typical effects of cecal coccidiosis become evident, and marked eroding of the mucosa or inner lining of the pouches takes place. If the degree of infection is severe, that is to say, one resulting from ingestion of 100,000, or even fewer, viable sporulated oocysts of *Eimeria tenella* by a twelve-week old chicken, or of course even fewer viable sporulated oocysts if the chicken is younger, at this point there may be profuse hemorrhaging of the host and death. Provided the chicken still lives and there are available epithelial cells, the second generation merozoites penetrate new epithelial cells. Some of these merozoites are destined to become male sex cells or microgametocytes while other are destined to become female sex cells or macrogametocytes; and a few other merozoites may develop into third generation schizonts. During development, the microgametocytes or male sex cells form and release numerous microgametes which unite with the macrogametes, or egg cells formed from the macrogametocytes, resulting in the formation of the zygotes or fertilized cells. There zygotes then become oocysts after they develop protective walls.

About the sixth day after the infection starts, the internal newly formed oocysts are ready to pass from the epithelial cells into the lumens and then, in the droppings, out of the body of the chicken. The life cycle of the coccidium within the host usually takes from six to ten days, the time required depending on several biological factors, including the age of the sporulated oocysts at the time of ingestion by the chicken. For example, if the sporulated oocysts are two years old at the time of ingestion by the chicken, a minimum of seven days will be required to complete their life cycle in the chicken as compared with six days or slightly less for sporulated oocysts under three months of age at the time of ingestion.

When they pass from the body of the chicken, the oocysts are in a single cell non-infective stage called unsporulated oocysts. Under favorable conditions of temperature and moisture the fertile oocysts will usually become infective within 24 to 48 hours. Under optimum conditions, some oocysts develop to the infective state within 18 hours. Oocysts can remain viable in the non-infective stage and when conditions are favorable become infective. The infective or sporulated oocyst stage of the Eimeria species contains 4 sporocysts, each with two sporozoites, making a total of eight sporozoites per infective oocyst. Thus the oocyst changes by asexual reproduction from a single non-infective cell to eight infective parasites each capable of invading and parasitizing epithelial cells lining the lower digestive tract when such oocysts are ingested by the proper susceptible host. Sporulated oocysts have been known to survive for many months in nature.

My new method for obtaining the sporulated oocysts of *Eimeria tenella* will now be described in greater detail.

As will be understood, the conventional precautions against contamination which are employed in the general art of producing vaccines are applied at all stages of my new method for producing an oral vaccine. Thus, the chickens which are to be inoculated are healthy and disease-free; a pure culture of sporulated oocysts of *Eimeria tenella* is used in the inoculating dose: the inoculated chickens are placed in sterilized cages and thereafter are continuously protected from contamination until the end of the harvesting period; the oocyst harvest is collected and processed using sterilized equipment; and the suspensions of sporulated oocysts resulting from the processing are placed in sterilized bottles, using sterilized equipment, and the operators carrying out the bottling procedure wear sterilized gowns, masks, caps, and the like.

THE CHICKENS

The chickens can be either heavy-breed, such as Plymouth Rock, New Hampshire, and the like, or light-breed, such as White Leghorn, and the like. When birds of the same age are compared, the yield of oocysts per bird is somewhat greater with a heavy-breed chicken than with a light-breed chicken. The heavy-breed chickens are generally more docile and thus more easily handled than the light-breed chickens and, moreover, the former are more suitable for meat production after their usefulness in the oocyst-producing method is over. Accordingly, I ordinarily prefer to use the heavy-breed chicken in my new method. The sex of the chickens has no significant effect on the results afforded by my production method.

As already indicated, the chickens which are to be inoculated should be healthy and disease-free, and in particular they should be from Salmonella-clean (i.e., *pullorum*-free) stock and coccidia-free. Such chickens are readily obtained by known procedures; e.g., see the discussions by Henry Van Roekel in "Diseases of Poultry," first edition, edited by H. E. Biester and Louis Devries, The Collegiate Press, Ames, Iowa, 1945, pages 177–219, and fourth edition, edited by H. E. Biester and L. H. Schwarte, The Iowa State University Press, Ames, Iowa, 1959, pages 162–201. For instance, eggs from chickens known to be Salmonella-clean, as determined by repeated testing using the method of The National Poultry Improvement Plan of the United States Department of Agriculture, Miscellaneous Publication No. 300: 28 (1941), are incubated in a forced-draft incubator, with formaldehyde fumigation of the eggs immediately prior to the hatching period. On hatching, the chicks are taken in clean, new boxes to a control-room used exclusively for rearing of uninfected chicks and there they are placed in batteries of sterilized starting cages. During growth prior to use, all unhealthy-looking birds are discarded; and, moreover, if the dams which produced the eggs become sick during the incubation period all the chicks are discarded. Further, random samples of fecal material from each deck of all batteries are collected twice weekly and examined for presence of contaminating pathogenic bacteria; and if the presence of contaminating coccidia is suspected, appropriate examination for these is made. If any such contamination is found, all of the chicks in the room are discarded, the room is cleaned and disinfected, and a new lot of chicks is started.

After hatching, the chicks are fed a balanced diet, for instance commercial starting mash, and under condition of growth in the battery, the average weight of the birds increases in a regular and predictable fashion to an average weight of approximately five pounds for a twelve-week old heavy-breed bird or approximately three pounds for a twelve-week old light-breed bird.

The figure in the accompanying drawing is a graph showing typical growth curves for heavy-breed and light-breed chickens for a period of twelve weeks from hatching, the average weight per bird in pounds being plotted against the age of the bird in weeks.

As will be described more fully below, in my new production method the number of oocysts of *Eimeria tenella* produced in each inoculated chicken increases as the age and weight of the bird at time of inoculation increases, so that in a chicken inoculated at the age of twelve weeks many more oocysts will be produced than in a chicken which is inoculated at the age of one day. On the other hand, the period of maintenance of the birds in heathy and coccidia-free condition is of course shorter when they are used at an early age and, moreover, problems caused by moulting and need for larger housing facilities may be encountered as the birds grow older and heavier, especially when a large number of birds is inoculated at the same time. Another consideration involved is that newly hatched chickens have some degree of resistance to infection which persists for three to four weeks before being gradually lost. Due to the foregoing factors, I generally find it advantageous to inoculate chickens which are about four to five weeks old, that is, shortly after the natural resistance to infection has been lost, since the birds are then old enough to afford a good yield of oocysts, but maintenance problems are still relatively simple.

It is preferred to starve the chickens immediately prior to inoculation for several hours, for instance two to four hours during daylight or in the presence of artificial light, or about 8–10 hours or more when the birds are in the dark, for instance at night in the absence of artificial light, because it appears that the presence of food in the digestive tract of the birds at the time they are inoculated makes the inoculum less effective, probably due to dilution. After starving the birds in this manner, I have found that the infection produced by the subsequent inoculation with *Eimeria tenella* is more uniform and that a greater percentage of the sporozoites from the sporulated oocysts become established at the site of infection than in birds which have not been so starved.

Birds to be inoculated for production of oocysts are placed in sterilized cages and moved into an inoculation room.

Depending on the number of sporulated oocysts it is desired to produce and the capacity of the available production facilities, one or more chickens will be employed. For commercial purposes, I have found it ordinarily convenient to employ about 500 to 2500 chickens in starting each production of sporulated oocysts, but of course the particular number of chickens can be varied as desired. I have found it convenient, but not necessary, to employ chickens of the same age and breed, and thus also substantially of the same weight, so that the same inoculating dose of sporulated oocysts of *Eimeria tenella* can be given to each bird, thereby simplifying the operating procedure.

INOCULATION

The infective inoculum is an orally administered dose of viable sporulated oocysts of *Eimeria tenella*. As will be appreciated, the inoculum must be prepared from a culture of *Eimeria tenella* which is pure and in particular is free of the oocysts of other chicken-infective species of Eimeria if it is desired that the resulting infection produce oocysts of *Eimeria tenella* only. The requisite pure culture can be obtained by conventional biological techniques by starting with isolation of a single oocyst of *Eimeria tenella* and propagation in a coccidia-free chicken.

The number of sporulated oocysts of *Eimeria tenella* in the inoculating dose is correlated within the range 100 to 40,000 with the age and weight of the chicken, so that the very young chickens receive the smaller doses in the indicated range while the older and heavier chickens receive the larger doses. Thus, for instance, the number of viable sporulated oocysts in the inoculum is approximately 100–300 for a chicken one day old; is preferably 200–1000 when a bird one week of age is employed; is preferably 400–40000 when the bird is five weeks old; and is preferably 800–8000 when the bird is eight weeks old, whereby the best yields of viable oocysts are obtained.

When heavy-bred chickens are employed, I have found that the approximate number of viable sporulated oocysts in the inoculum, for highest yields, is 300 for a bird one week old, 1500 for a bird five weeks old, and 3000 for a bird eight weeks old. When light-breed chickens are used, the approximate number of viable sporulated oocysts in the inoculum, for highest yields, is on the order of 50 to 75 percent that of the optimum number for a heavy-breed chicken of the same age.

The number of oocysts in the infective inoculum used in my new method is of course in terms of viable sporulated oocysts. Thus, it will be readily appreciated that when using inocula containing a substantial number of non-infective oocyst forms, such as immature, dead, or unsporulated oocysts, care should be exercised to ensure that a given inoculum in fact contains the required number of viable sporulated oocysts of *Eimeria tenella*.

The appropriate adjustment to the number of sporulated oocysts in the infective inoculum, as herein described by me, can be made readily by well-known general techniques. Thus, using a hemocytometer, the sporulated oocysts of *Eimeria tenella* in an aliquot, for example 0.001 ml., of a given aqueous suspension of the organisms are counted, immature or unsporulated stages being disregarded, thereby establishing the concentration of sporulated oocysts per ml. of suspension and allowing determination of the appropriate volume of the suspension providing the desired number, in the range 100–40,000, of viable sporulated oocysts in the infective inoculum. Conveniently, the concentration of the oocysts in the supension is adjusted so that the volume of each infective inoculum is on the order of 1–2 ml.

The inoculum can be administered orally to the chickens in any suitable manner which assures that the chicken receives and retains an appropriate number of sporulated oocysts. I have found that best results are obtained when the inoculum is administered through the esophagus into the crop of the bird. For this purpose, a calibrated pipette is particularly convenient, especially when a large number of chickens is to be inoculated.

DEVELOPMENT OF INFECTION IN THE OOCYST-PRODUCING CHICKENS

The inoculated chickens are placed in sterilized wirefloored (one-half to one inch mesh wire) cages, conveniently up to about 20–30 chickens per cage, and remain in these cages until the termination of the harvesting of oocysts from the cecal droppings. A collecting pan or paper is placed about two to four inches or more below the wire floor of the cage, and the water and food containers are attached to the outside of the cage, so as to minimize contamination of the droppings and facilitate their collection.

In the inoculated chicken, the sporulated oocysts of *Eimeria tenella* in the infective inoculum develop through the several stages of the life cycle of this coccidium in the manner described above, so that millions of oocysts are produced in the bird and passed in the droppings. However, by correlating the size of the infective dose of sporulated oocysts with the age and weight of the chicken in the manner described above, the clinical manifestations of coccidiosis are either absent or very mild. When optimum production conditions have been employed, the chickens remain healthy and vigorous in appearance and gain weight normally. As a consequence, unless they are sacrificed, substantially all of the chickens employed in my production method can be expected to survive the infection as economically useful birds. If any chickens die after inoculation, autopsies are carried out to determine cause of death. It has been found that such few deaths as occur are almost invariably due to mechanical mishaps, such as strangulation when a chicken gets its neck caught in the cage wire, and are not the result of the infection.

This feature of minimizing or avoiding the deleterious effects of the infection on the chicken while at the same time obtaining a high production of oocysts is in sharp contrast with the usual procedures of the prior art. Thus, in conventional methods, increasingly heavy infection of the chicken by *Eimeria tenella* is relied on to cause increased production of oocysts, so that the chicken exhibits definite signs of coccidiosis. However, I have found that infective inoculations of sporulated oocysts of *Eimeria tenella* in sufficient numbers to cause appearance of the typical clinical signs and symptoms of cecal coccidiosis in the chicken do not in fact lead to satisfactory yields of the desired oocysts. To the contrary, in the bird with a severe infection, few or perhaps no oocysts are produced; and, moreover, the bird sheds large amounts of blood and intestinal debris along with the oocysts so that the latter cannot be separated and recovered without serious loss of viability.

HARVESTING THE OOCYSTS AND REMOVING GROSS DEBRIS THEREFROM

The oocysts of *Eimeria tenella* produced in the chickens by the infection are harvested during the approximate period from the 144th hour to the 288th hour after the inoculation. The yield of oocysts before and after this period is usually too low to make collection of them worthwhile. The oocysts are harvested from the cecal droppings of the birds and, if desired, also from the cecal pouches of the birds after sacrificing them. It is normally preferred not to sacrifice the birds until after the yield of oocysts per collection of cecal droppings has reached a peak and started to decline markedly.

Harvesting of the oocysts from the cecal droppings is carried out as follows. Starting about 136 hours after the infective oral inoculation, a sample of the moist fresh cecal droppings of the birds is examined microscopically for the presence of oocysts of *Eimeria tenella*. Collection of the cecal droppings is ordinarily started about 114–146 hours (that is, at the beginnings of the seventh day) after inoculation, collections of the moist fresh droppings being made periodically, conveniently twice per day, for instance once in the morning and once in the afternoon. In order to avoid interference with the rhythmic cycle of cecal elimination, it is preferable not to use night lights. The cecal droppings are collected in any suitable manner from the dropping paper or pans on which they fall, such as with a spatula. Some intestinal droppings may be found mixed with the cecal droppings, of course, but this does not matter, and in such instances the mixed droppings are collected and processed as usual. Ordinarily, the collection of the cecal droppings is made over a period of up to about ninety-six hours, that is during from one to four days starting with the seventh day after inoculation, and may be terminated by sacrifice of the birds. The processing of each collection of fresh cecal droppings is begun without undue delay after the collection is made; that is, all of the droppings collected at any particular time are mixed, and the subsequent debris removal, aeration, and washing steps are carried out on each such batch independently of the processing of batches collected at different times. It is advantageous to keep the rooms in which birds are producing at high humidity. The droppings while still fresh and moist are mixed with sufficient 1–4 percent aqueous potassium dichromate solution, or less desirably are mixed with a more dilute aqueous potassium dichromate solution or water, so that a suspension of thin consistency is obtained. The suspension of oocysts is stirred thoroughly, while at the same time avoiding vigorous emulsification procedures which may cause formation of air bubbles, or rupture or otherwise damage the oocysts, and then an oocyst count is made on a small aliquot of the suspension to determine the concentration of oocysts. The larger insoluble particles of debris, consisting chiefly of feathers, partially digested or undigested feed, and the like, mixed with the oocysts are then removed from the suspension. This can be done conveniently by filtering the suspension through a 60–200 mesh screen. For best yields, the use of cotton gauze or similar material is not advisable since many oocysts may be trapped on the cloth and not readily recovered in practical manner. The filtered suspension is allowed to stand for a few minutes, for instance up to about five minutes. This is sufficient time to allow deposition of any coarse particles of debris which were small enough to pass through the filter, but not long enough for oocysts to settle out of suspension. If no appreciable amount of debris settles out during this period, the suspension is suitable for direct use in the subsequent aeration step. However, if a substantial amount of sediment has deposited, the supernatant liquid layer containing most of the oocysts suspended therein is decanted or siphoned off and is retained. The sediment is washed one or more times with fresh portions of dilute aqueous potassium dichromate solution or water to recover oocysts which may be entrapped by the debris, and the supernatant wash liquid is in each instance removed from any debris which settles out of suspension during a period of standing of about 1–5 minutes. All of the supernatant liquids with oocysts suspended therein and thus collected are combined for processing in the aeration step, and the washed debris is discarded.

The major portion of the potential harvest of oocysts is obtained in the foregoing manner. As indicated above, if desired, a further number of oocysts can be harvested from the cecal pouches of the birds. This is done by sacrificing the birds, removing and opening the cecal pouches, and washing the oocysts contained therein with and into a 1–4 percent aqueous solution of potassium dichromate. The resulting suspension of oocysts is ordinarily ready for the aeration step, but if coarse particles of debris are present, these can be removed by screening. The number of oocysts in the cecal pouches is ordinarily not large enough to warrant sacrifice of the chickens before about the 156th hour (that is, about six and one-half days) after inoculation. The optimum time for sacrifice to obtain best oocyst harvest is usually during the approximate period from the 168th hour to the 240th hour after inoculation, the particular time for best harvest within this period being as noted hereinabove dependent on the age of the culture of *Eimeria tenella* used in the infective inoculum. For example, I have found that when the infective inocula of Eimeria tenella are young, that is, from a culture up to about three months of age, the maximum number of oocysts is in the cecal pouches about 192–216 hours (during the ninth day) after inoculation, whereas when an older culture about 1–2 years of age is used the maximum number of oocysts is in the pouches about 216–240 hours (during the tenth day) after inoculation.

Harvesting the oocysts from the cecal pouches as described above by washing the opened pouches, instead of following the ordinary procedure of scraping or comminuting and emulsifying the pouches and the contents thereof, has the advantages of: avoiding oocyst rupture; affording oocysts which can be sporulated in a high percentage yield, on the order of 85–95 percent; affording a higher percentage of fully mature, fertile oocysts capable of sporulating; and yielding oocyst suspensions that have less organic debris, the presence of which may lead to a serious lessening of stability of the oocysts, particularly on prolonged storage.

As indicated above, water or aqueous solutions of potassium dichromate below 1 percent in concentration can be used in the processing of the oocyst harvest to remove coarse insoluble particles of debris. However, I have generally found that use of a one to four percent aqueous potassium dichromate solution for such purpose affords better results, in that a greater percentage of the oocysts remains viable. In any event, regardless of which medium is used, it is important that each batch of the oocysts be suspended in 1–4 percent aqueous potassium dichromate solution within about four hours after being collected and remain in contact with such medium until the aeration step is carried out. This results in satisfactory preservation of the viability of the oocysts for a period of up to about eighteen hours after collection, whereas delays beyond the four hour period in getting the oocysts into 1–4 percent aqueous potassium dichromate solution will result in diminution of the viability of the oocysts and as a conseqence the yield of sporulated oocysts in the aeration step will undesirably be reduced.

AERATION OF THE OOCYSTS AND RECOVERY OF THE RESULTING SPORULATED OOCYSTS

A small number of the harvested oocysts of Eimeria tenella will have undergone partial or complete sporulation either prior to collection or during the debris removal procedure. However, the percentage of the oocysts which becomes sporulated in this manner is for practical purposes negligible, and it is necessary to aerate the oocysts efficiently to obtain a satisfactory degree of sporulation. Although suspension of the unsporulated oocysts in the dichromate solution serves to preserve their viability to some degree, for best results the aeration of the oocysts should be commenced as promptly as possible after their collection from the cecal droppings or the cecal pouches. Under ordinary operating conditions, I have found it feasible to complete the collection and debris removal, and then begin the aeration of each batch of oocysts within about four hours, or under optimum conditions within about one to two hours, after its collection. When commencement of aeration is delayed longer than about eighteen hours after the oocysts are collected, the resulting product undesirably contains a substantial percentage of dead, unsporulated oocysts.

The oocysts, suspended in a 1–4 percent aqueous solution of potassium dichromate, are aerated at a temperature of 19–37° C. If desired, the aeration is carried out by exposing thin layers of oocyst suspensions in open petri dishes to the air, but it is usually much more satisfactory in large scale production to place the suspensions in flasks and aerate by bubbling oxygen or air through the suspension. Ordinarily, all oocysts that are capable of sporulation are sporulated within 72 hours by aeration at a temperature in the preferred range of 24–30° C. The optimum temperature range for rapid sporulation is 28–29° C., at which temperature maximum sporulation is usually complete within 27 to 30 hours after aeration is commenced. Continuation of aeration for twenty-four hours or more after sporulation is complete is not harmful, but is not necesary and affords no advantage.

After the aeration step has been completed, it is advantageous thereafter to maintain the sporulated oocyst suspensions at lower temperatures, for instance at about 21–22° C., or lower, but in any event above freezing, since the sporulated oocysts remain viable longer under such conditions.

After the aeration step is completed, the sporulated oocysts are washed with fresh portions of 1–4 percent aqueous potassium dichromate solution to remove substantially all bacteria and also to remove residual amounts of debris which may be left after the earlier debris removal step. This washing, which is necessary to the satisfactory storage stability of the sporulated oocysts, is carried out readily in the following manner. The suspension of sporulated oocysts from the aeration step is stirred thoroughly and then allowed to stand for about five to ten minutes to allow any residual debris to settle out, the supernatant liquid with the oocysts suspended therein is decanted off or otherwise removed from the debris (which is desirably retained for recovery of oocysts therein) and the suspension thus separated is allowed to stand until substantially all of the sporulated oocysts therein have settled out into the lower 10–20 percent or so of the volume of the dichromate solution. Under ordinary conditions this requires about six to twelve hours. The supernatant layer, which is virtually free of oocysts, is then removed and discarded. This removal is advantageously made without undue delay after the sporulated oocysts have deposited, since fine debris and a substantial portion of any dead or living bacteria still remaining suspended in the supernatant liquid are thereby separated from the desired product, thus improving its storage stability. I have found therefore that prolonged settling periods, for example of several days or more, are desirably avoided, particularly in the first recovery of the sporulated oocysts.

The debris from the initial washing above, if retained, is mixed with several volumes, for instance four to ten volumes, of 1–4 percent aqueous potassium dichromate solution and, as before, the resulting suspension is allowed to stand for several minutes (about three to five minutes is usually sufficient in this instance) to allow the debris to settle, but not long enough to allow the oocysts to settle, and the supernatant liquid with oocysts suspended therein is removed. This suspension is allowed to stand until substantially all of the sporulated oocysts therein have settled out into the lower 10–20 percent or so of the volume of the dichromate solution (about six to twelve hours standing) and the supernatant layer is then removed and discarded. The sporulated oocysts recovered in this manner can be combined with those in the first recovery above.

To assure good storage stability, the sporulated oocysts thus collected are washed with fresh portions of dilute aqueous potassium dichromate solution, using the sedimentation technique to recover the sporulated oocysts from the wash liquid. This washing reduces the debris and bacteria content of the suspension of sporulated oocysts and prolongs the useful storage life of the sporulated oocysts. I have found that a total of three to five washes is generally satisfactory for the usual commercial storage conditions although more washes can of course be readily carried out if desired. When prolonged storage is not involved, repeated washing is not necessary.

After each collection of oocysts has been processed through the debris removal, aeration, and washing steps as above described, it is usually advantageous to pool the resulting suspensions of the entire yield of sporulated oocysts. The pooled suspension is allowed to stand for six to twelve hours to allow the sporulated oocysts to settle out, the supernatant liquid is removed and discarded, and one or more volumes of 1–4 percent aqueous potassium dichromate solution is added. The resulting suspension is tested bacteriologically for pathogens on standard bacteriological media and is tested for purity subcutaneously, intratracheally, and intranasally in accordance with the same serum-virus-toxin procedure as described for Newcastle disease vaccine in the Code of Federal Regulations of the U.S. Dept. of Agriculture, Title 9, chapter I, subchapter E, part 114.6 (c), edition of November 1954, with the exception that daily observations of the results for fourteen days are made instead of for twenty-one days. The sporulated oocysts are tested for potency by oral challenge of non-immune birds. In all of the foregoing purity and potency tests, the test birds are weighed at time of inoculation and again one week and two weeks after inoculation, and are observed daily. All birds which die are subjected to autopsy to determine cause of death.

After the suspension of sporulated oocysts has passed the tests described above, if storage is necessary or desirable, as is true under ordinary circumstances, the sporulated oocysts are allowed to settle out of suspension, are recovered, and are then suspended in a fresh portion of 1–4 percent aqueous potassium dichromate solution. After determining the number of sporulated oocysts per ml. of suspension by microscopic examination of an aliquot, and adjusting the suspension to contain the desired number of sporulated oocysts per ml., the supensions are stored under refrigeration at 0–10° C. in tightly sealed bottles which are only partially filled, leaving an air space above the liquid of about half or more of the total volume of the bottle if prolonged storage is contemplated. Under such conditions the sporulated oocysts remain at maximum viability for over a year, and the suspensions remain useful for several years or more. Insufficient air space will result in shortening the life of the sporulated oocysts in the suspension.

As will be appreciated, freezing of the suspensions of sporulated oocysts should be avoided, since freezing kills the sporozoites.

Water alone, which provides no substantial source of oxygen and does not afford sterilizing conditions, is not a suitable medium for prolonged storage of the sporulated oocysts since the rate of loss of viability is appreciable therein.

The potassium dichromate used in the several steps of my method and in the storage medium should be of good quality. This compound serves the several purposes of acting as an antibacterial, antifungal, and antiviral agent and of also supplying oxygen to the oocysts during and after sporulation so as to help preserve their viability. Relatively high concentrations of the potassium dichromate, for instance concentrations appreciably higher than 4 percent, have a deleterious effect on oocysts of *Eimeria tenella*, whether sporulated or unsporulated; and the use of concentrations lower than 1 percent is not desirable, perhaps due to insufficient antibacterial, antifungal, and antiviral activity or furnishing insufficient oxygen. Thus, concentrations of potassium dichlorate outside the one to four percent range afford less satisfactory results in the practice of my invention. I generally prefer to employ a 2.5 percent solution of potassium dichromate in the practice of my invention. Other oxidizing agents possessing mild antibacterial, antifungal, and antiviral properties and which are not harmful to the oocysts can be substituted for the potassium dichromate.

In a preferred aspect, my new production method comprises the steps of: infecting a healthy, disease-free chicken four to five weeks of age and weighing approximately 0.75–1.75 pounds by inoculation with an oral dose of viable sporulated oocysts of *Eimeria tenella* in which the number of said viable sporulated oocysts is approximately 1000–2000; harvesting during the period from 144 hours to 288 hours after the inoculation the oocysts of *Eimeria tenella* produced by the infection by periodically collecting the moist fresh cecal droppings from the infected chicken over a period of up to 96 hours beginning 144–192 hours after the inoculation; mixing the harvested oocysts, within approximately two hours after collection thereof, with a 1–4 percent aqueous potassium dichromate solution and removing coarse insoluble particles of debris from the suspension of oocysts thus obtained; aerating the oocysts, beginning within approximately four hours after their collection, in a 1–4 percent aqueous potassium dichromate solution at a temperature in the approximate range 19–37° C., thereby causing sporulation of the oocysts; washing the sporulated oocysts with 1–4 percent aqueous potassium dichromate solution; and recovering the sporulated oocysts of *Eimeria tenella* thus produced.

The new production method of my invention is illustrated by the following examples without, however, being limited thereto.

*Example 1*

Fifty-nine healthy, coccidia-free Vantress-White Plymouth Rock Cross chickens six weeks of age which had been raised on a coccidiostat-free ration were starved overnight (about eight hours) and were orally inoculated the following morning with *Eimeria tenella*. The infective inoculum per bird consisted of one ml. of water having suspended therein approximately 600 viable sporulated oocysts of *Eimeria tenella* and was administered in each instance through the esophagus into the crop of the bird by means of a calibrated pipette.

Beginning 136 hours after the inoculation, samples of the moist fresh cecal droppings of the inoculated chickens were examined microscopically twice daily, once in the morning and once in the afternoon, for the presence of oocysts. These examinations were essentially negative until the cecal droppings sampled at the 144th hour after inoculation were checked. These droppings, which appeared to contain an appreciable number of oocysts, were collected and then mixed with approximately 75 ml. of 2.5 percent aqueous potassium dichromate solution. A one ml. sample of this mixture was diluted to a volume of 10 ml. with water. By use of a hemocytometer it was found that the number of oocysts per ml. in the diluted sample was approximately 91,000 and the occyst collection from which the sample was taken was therefore retained as part of the oocyst harvest. The subsequent collections of the moist fresh cecal droppings were also retained and processed. The time of collection, the yield of oocysts per collection, and other pertinent data are shown below in Table I.

Each retained suspension of oocysts designated below in Table I was diluted to a volume of about one liter with additional 2.5 percent aqueous potassium dichromate solution, and each diluted suspension was stirred and filtered through an 80 mesh copper wire screen to remove the larger particles of debris. In each instance, the filtrate was allowed to stand for about five minutes and then the supernatant layer, which contained the oocysts suspended therein, was decanted from the debris which had settled out. A further yield of oocysts entrapped by the debris was recovered by the following washing procedure. About 700 ml. of 2.5 percent aqueous potassium dichromate solution was mixed with the debris, the mixture was allowed to stand for about five minutes, and the supernatant liquid was decanted from the debris which had settled out. This washing, sedimentation, and decantation treatment was carried out three times on the debris, using fresh portions of 2.5 percent aqueous potassium dichromate solution each time, and all of the supernatant liquors from the cecal droppings collected at a given time were combined. It was determined that the separate collections of combined supernatant liquors contained, in the aggregate, about 97 percent of the potential oocyst crop from the cecal droppings, and the number of oocysts per collection of droppings ranged approximately from 12 to 120 million oocysts, as can be seen in Table I.

The suspension of oocysts obtained as above described from each of the nine collections of cecal droppings was placed on an aerator within 1-2 hours after each respective collection. Each suspension of oocysts was treated as follows: The suspension was placed in one-liter flasks, about 800 ml. of the suspension being placed in each flask and, while maintaining the flask contents at a temperature of 28–29° C., air was bubbled through the suspension in each flask for seventy-two hours to sporulate the oocysts. The flasks were shaken frequently to insure against packing or clumping of solid material, since I had found that such packing or clumping would reduce the percentage of oocysts sporulating. Aeration was then discontinued and the flasks were allowed to stand for about twelve hours, during which period the sporulated oocysts settled out of suspension. The supernatant liquid was decanted from the sporulated oocysts, and, after determining that it contained virtually no oocysts, this liquid was discarded. The wet deposits of sporulated oocysts from the several flasks were pooled, allowed to settle for 12–24 hours, and supernatant liquid containing no sporulated oocysts was drawn off and discarded.

All of the suspensions of sporulated oocysts obtained by processing the cecal droppings were pooled, the resulting suspension was diluted with about half its volume of a fresh portion of 2.5 percent aqueous potassium dichromate solution, and the suspension was allowed to stand for about 12 hours. The supernatant liquid was drawn off from the deposit of sporulated oocysts and discarded. The product thus obtained consisted of a concentrated suspension of viable sporulated oocysts of *Eimeria tenella* in 2.5 percent aqueous potassium dichromate solution.

The oocysts in the cecal pouches were then harvested as follows. Two hundred and forty hours after inoculation, at the time of the last collection of cecal droppings, the 59 infected chickens were sacrificed. Using sterilized instruments, the cecal pouches of each bird were removed and slit open, and the pouches were then dropped into approximately 300 ml. of 2.5 percent aqueous potassium dichromate solution. The cecal pouches were agitated in the solution to facilitate freeing of the oocysts from the pouches. The cecal pouches were then removed, transferred to another 300 ml. portion of 2.5 percent aqueous potassium dichromate solution, and agitated, after which the pouches were removed from the solution. Three more such washings of the cecal pouches were carried out to ensure good recovery of the oocysts but, since in this particular instance these three washings were found to be essentially free of oocysts, they were discarded. The washed pouches were discarded. The two retained 300 ml. suspensions of oocysts were combined and filtered through an 80 mesh copper wire screen to remove the larger particles of debris. The filtrate was allowed to stand for about five minutes, and the supernatant liquid, which contained the oocysts of *Eimeria tenella* suspended therein, was decanted from the relatively small amount of debris which had deposited.

The oocysts from the cecal pouches were sporulated and the resulting sporulated oocysts of *Eimeria tenella* were recovered, following the same aeration and recovery procedures described hereinabove for treatment of the collections of cecal droppings.

The concentrated suspensions of viable sporulated oocysts of *Eimeria tenella* obtained from the cecal droppings and from the cecal pouches were combined and the product was mixed with about half its volume of 2.5 percent aqueous potassium dichromate solution. The resulting suspension was allowed to stand for about twelve hours, during which period the sporulated oocysts settled out of suspension and concentrated in the lower 10–15 percent of the volume of potassium dichromate solution. The oocyst-free supernatant liquid was then removed and discarded. There was thus obtained about 600 ml. of a concentrated suspension of approximately 956,750 million viable sporulated oocysts of *Eimeria tenella* (or about 1,594,600 sporulated oocysts per ml.), representing a yield of an average of approximately 16.22 million sporulated oocysts per bird.

TABLE I.—COLLECTION OF OOCYSTS OF *EIMERIA TENELLA* FROM CECAL DROPPINGS AND CECAL POUCHES OF FIFTY-NINE 6-WEEK OLD CHICKENS INFECTED WITH 600-OOCYST DOSES

| Time of collection after inoculation (in hours) | Volume of combined droppings and diluent (in ml.) | Number of oocysts produced | | Mean (in thousands per chicken) |
|---|---|---|---|---|
| | | Total (in thousands) | | |
| | | Per ml. | Total | |
| 144 | 100 | 910 | 91,000 | 1,543.4 |
| 150 | 100 | 270 | 27,000 | 457.6 |
| 168 | 75 | 860 | 64,500 | 1,093.2 |
| 174 | 100 | 580 | 58,000 | 983.0 |
| 192 | 75 | 1,040 | 78,000 | 1,322.0 |
| 198 | 75 | 1,600 | 120,000 | 2,033.9 |
| 214.5 | 50 | 430 | 21,500 | 364.4 |
| 222 | 50 | 300 | 15,000 | 254.2 |
| 238 | 35 | 350 | 12,250 | 207.8 |
| 240 | 600 | 980 | 588,000 | 9,966.1 |

(Birds sacrificed; from cecal pouches).

|  | Million oocysts |
|---|---|
| Total from cecal droppings collected | 487.25 |
| Collected from washed cecal pouches | 588.00 |
| Grand total of production | 1,075.25 |

*Example 2*

The procedure described above in Example 1 was repeated, with the exception that 64 healthy, disease-free chickens four weeks of age were used and the infective inoculum for each chicken contained approximately 1000 viable sporulated oocysts of *Eimeria tenella* instead of 600. The results of the harvest of oocysts of *Eimeria tenella* obtained are set forth in Table II below.

TABLE II.—COLLECTION OF OOCYSTS OF *EIMERIA TENELLA* FROM CECAL DROPPINGS AND CECAL POUCHES OF SIXTY-FOUR 4-WEEK OLD CHICKENS INFECTED WITH 1000-OOCYST DOSES

| Time of collection after inoculation (in hours) | Volume of combined droppings and diluent (in ml.) | Number of oocysts produced | | Mean (in thousands per chicken) |
|---|---|---|---|---|
| | | Total (in thousands) | | |
| | | Per ml. | Total | |
| 151 | 40 | 30 | Discarded | 18.7 |
| 168 | 150 | 880 | 132,000 | 2,062.5 |
| 175 | 30 | 370 | 11,100 | 173.4 |
| 192 | 200 | 1,010 | 202,000 | 3,156.3 |
| 199 | 90 | 3,210 | 288,900 | 4,514.1 |
| 216 | 200 | 1,010 | 202,000 | 3,156.3 |
| 223 | 115 | 960 | 110,400 | 1,725.0 |
| 240 | 200 | 1,700 | 340,000 | 5,312.5 |
| 247 | 150 | 290 | 43,500 | 679.7 |
| 264 | 200 | 420 | 48,000 | 1,312.5 |

|  | Million oocysts |
|---|---|
| Total from cecal droppings collected | 1,414 |
| Collected from washed cecal pouches | 224 |
| Grand total of production | 1,638 |

About 1,638.0 million oocysts obtained in the foregoing manner and suspended in a 2.5 percent aqueous potassium dichromate solution were subjected to aeration at 28–29° C. for 72 hours. The yield of sporulated oocysts of *Eimeria tenella* thereby produced was approximately 1,490.5 million, representing sporulation of about 91 percent of the oocysts.

In similar fashion, from 24 White Plymouth Rock chickens four and one-half weeks of age orally inoculated with 1000 sporulated oocysts of *Eimeria tenella* per bird, by collection of the cecal droppings from the 168th to the 222nd hour after inoculation there were obtained 363.4 million oocysts. These birds were not sacrificed, and thus no harvest from the cecal pouches was made. When these oocysts were aerated, about 90 percent of them sporulated, and there was obtained approximately 570 ml. of dilute aqueous potassium dichromate solution in which were suspended about 640,000 viable sporulated oocysts of *Eimeria tenella* per ml.

Also, in similar manner, from 32 seven-week old New Hampshire-White Plymouth Rock Cross chickens receiving orally 1500 sporulated oocysts each, by collection of the cecal droppings from the 185th to the 288th hour there were obtained 1,281.0 million oocysts from the cecal droppings. No harvest of the cecal pouches was made.

*Example 3*

The procedure referred to in Example 2 as to the group of 64 chickens was duplicated at the same time with another group of 64 chickens, but using an infective oral inoculum of approximately 2000 viable sporulated oocysts of *Eimeria tenella* per chicken instead of 1000. The results of the harvest of oocysts of *Eimeria tenella* obtained are set forth in Table III below.

TABLE III.—COLLECTION OF OOCYSTS OF *EIMERIA TENELLA* FROM CECAL DROPPINGS AND CECAL POUCHES OF SIXTY-FOUR 4-WEEK OLD CHICKENS INFECTED WITH 2000-OOCYST DOSES

| Time of collection after inoculation (in hours) | Volume of combined droppings and diluent (in ml.) | Number of oocysts produced | | Mean (in thousands per chicken) |
|---|---|---|---|---|
| | | Per ml. | Total | |
| | | | Total (in thousands) | |
| 151 | 50 | 130 | Discarded | 101.6 |
| 168 | 150 | 760 | 114,000 | 1,781.3 |
| 175 | 75 | 690 | 51,750 | 802.6 |
| 192 | 150 | 1,040 | 156,000 | 2,437.5 |
| 199 | 60 | 3,210 | 192,600 | 3,009.4 |
| 216 | 100 | 1,800 | 180,000 | 2,812.5 |
| 223 | 85 | 960 | 81,600 | 1,275.0 |
| 240 | 150 | 1,030 | 154,500 | 2,414.1 |
| 247 | 150 | 480 | 72,000 | 1,125.0 |
| 264 | 150 | 720 | 108,000 | 1,687.5 |

Million oocysts
Total from cecal droppings collected _____ 1,110.5
Collected from washed cecal pouches _____ 364.0

Grand total of production _____ 1,474.5

About 1,474.5 million oocysts obtained in the foregoing manner and suspended in a 2.5 percent aqueous potassium dichromate solution were subjected to aeration at 28–29° C. for 72 hours. The yield of sporulated oocysts of *Eimeria tenella* thereby produced was approximately 1,327.0 million, representing sporulation of about 90 percent of the oocysts.

The results of Examples 2 and 3 showed that the infective dose of 1000 sporulated oocysts gave better yields from these birds than the dose of 2000 sporulated oocysts.

*Example 4*

In this example, there are compared three different levels of infective doses, and also two different methods of harvesting the oocysts from the cecal pouches.

Three groups of healthy, coccidia-free New Hampshire chickens five weeks old were starved about fourteen hours overnight and were orally inoculated the following morning with a five-month old culture of sporulated oocysts of *Eimeria tenella* as follows: one group of 30 chickens was infected with 400 sporulated oocysts per bird; a second group of 30 chickens, 2000 sporulated oocysts per bird; and the third group of 40 chickens, 10,000 sporulated oocysts per bird. The infective inoculum in each instance was a 1 ml. suspension of the sporulated oocysts which was administered into the crop of the chicken by means of a calibrated pipette. The three groups of chickens were kept separate from each other after inoculation. Ten representatives of each group were sacrificed at the end of the seventh, eighth, and ninth days after inoculation. Of the 40 chickens inoculated with the 10,000-oocyst dose, 8 died during the sixth to ninth days after inoculation; and after sacrificing 10 birds of this group at the end of the ninth day after inoculation, the two surviving chickens were sacrificed on the tenth day after inoculation.

After removing the two cecal pouches from each sacrificed bird, one of the pouches was slit open and the contents washed with and into a 2.5 percent aqueous potassium dichromate solution in a manner similar to that described above in Example 1; and the other cecal pouch of each bird was cut up and then ground for one minute in a 2.5 percent aqueous potassium dichromate solution using a blending machine. Each of the suspensions obtained from the 184 pouches (the 16 pouches of the 8 birds which died of the infection not being used) was aerated in a separate petri dish for four days at room temperature (about 20–30° C.). After sporulation, 10 ml. of 2.5 percent aqueous potassium dichromate was used to wash the contents of each petri dish into a bottle. Sufficient distilled water was added to bring the volume in each bottle up to 20 ml. The number of mature oocysts, sporulated and unsporulated, in each suspension was determined, using a hemocytometer. The total number of oocysts per pouch per bird was then doubled to calculate the potential number of oocysts per bird when harvesting by the washed-pouch and comminuted-pouch methods, respectively. The results obtained are summarized in Table IV below.

TABLE IV.—COMPARISON OF OOCYST YIELD FROM CECAL POUCHES USING TWO DIFFERENT HARVESTING METHODS AND THREE DIFFERENT INFECTION LEVELS

| Time of sacrifice after inoculation (in hours) | Number of oocysts inoculated chicken | Number of chickens | Mean Number of oocysts per chicken in millions | | | | | |
|---|---|---|---|---|---|---|---|---|
| | | | Washed pouches | | | Comminuted pouches | | |
| | | | Total fertile oocysts | Number sporulated | Percent sporulated | Total fertile oocysts | Number sporulated | Percent sporulated |
| 168 | 400 | 10 | 21.2 | 18.4 | 86.7 | 19.5 | 13.3 | 68.2 |
| | 2,000 | 10 | 30.6 | 26.6 | 85.3 | 30.9 | 21.0 | 68.0 |
| | 10,000 | 10 | 16.5 | 14.2 | 87.1 | 21.7 | 15.3 | 70.5 |
| 192 | 400 | 10 | 37.4 | 35.5 | 94.9 | 31.1 | 25.9 | 83.3 |
| | 2,000 | 10 | 33.9 | 32.7 | 96.5 | 23.3 | 19.8 | 85.0 |
| | 10,000 | 10 | 13.7 | 12.6 | 92.0 | 17.7 | 14.7 | 83.1 |
| 216 | 400 | 10 | 26.8 | 24.2 | 90.3 | 24.2 | 21.1 | 87.2 |
| | 2,000 | 10 | 15.8 | 14.9 | 94.3 | 19.2 | 16.3 | 84.9 |
| | 10,000 | 10 | 8.7 | 8.1 | 93.1 | 13.1 | 11.2 | 85.5 |
| Mean/bird for the 3 days | 400 | 30 | 28.5 | 26.0 | 91.5 | 24.9 | 20.1 | 89.6 |
| | 2,000 | 30 | 26.8 | 24.6 | 91.8 | 24.5 | 19.0 | 77.8 |
| | 10,000 | 30 | 13.0 | 11.6 | 89.7 | 17.5 | 13.7 | 78.5 |
| Mean for all groups and days | | 90 | 22.77 | 20.73 | 90.8 | 22.3 | 17.6 | 78.9 |

The substantial advantage of my washed-pouch harvesting procedure as compared with the conventional method of harvesting from comminuted pouches, in affording oocysts which are sporulated in high yield, about 85–95 percent, is clearly evident from the data above.

Moreover, the harvest from the washed pouches contained no ruptured oocysts such as were found in the harvest from the comminuted pouches. The oocysts from the washed pouches produced sporulated oocysts which were still viable after two years storage at 4–7° C., whereas under the same storage conditions the sporulated oocysts obtained by sporulation of the oocysts from the comminuted pouches were no longer viable after two years.

Each of the suspensions of viable sporulated oocysts of *Eimeria tenella* in dilute aqueous potassium dichromate solution produced in accordance with my invention as illustrated in the above examples was placed in tightly-sealed bottles which were only about 40 percent filled, thus leaving an airspace above the liquid amounting to about 60 percent of the volume of the bottle. For longest preservation, these suspensions were stored under refrigeration at 0–10° C.; and I found it ordinarily preferable to use a storage temperature of about 8° C. Under these conditions, the sporulated oocysts were still viable and potent after four years' storage. At higher temperatures, the sporulated oocysts were less stable, but storage at ordinary room temperatures for several weeks was usually found to be satisfactory. At 60° C. and above, the sporulated oocysts were killed very rapidly.

The suspensions of sporulated oocysts prepared in accordance with my invention as described in the foregoing examples were each tested bacteriologically on two different types of enriched media, and in each instance the product was found to be satisfactory and free of pathogens. The products were also tested for purity and potency in the following manner. Twenty-four healthy, coccidia-free white Leghorn chickens 2–3 weeks of age were inoculated as follows: 3 chickens, each subcutaneously with approximately 2000 sporulated oocysts; 3 chickens, each intranasally with approximately 2000 sporulated oocysts; 3 chickens, each intratracheally with approximately 2000 sporulated oocysts; 12 chickens, orally by pipette after starving them for about four hours, each with a challenge dose of approximately 12,000 sporulated oocysts calculated to kill about half of the birds; and 3 chickens, as controls, with oocyst-free dilute aqueous potassium dichromate solution. The birds were weighed at time of inoculation and at seven, fourteen, and twenty-one days after inoculation. Two of the challenged chickens were then sacrificed at seven days after inoculation, autopsied, and examined critically for lesions and coccidia in all parts of the intestines from duodenum to rectum. The results of these tests were as follows: each of the products tested was free of coccidia other than *Eimeria tenella* and thus immunogenically pure; 6 of the 12 challenged birds died, indicating that each of the products was viable and potent; there was no mortality among the birds other than those receiving a challenge dose; there was no evidence of respiratory difficulty in any of the chickens; and there was no sign of abscess at site of subcutaneous inoculation.

The foregoing tests indicated that all of the suspensions of sporulated oocysts prepared in accordance with my new method were safe for use as inocula to be used for immunization of chickens against cecal coccidiosis.

IMMUNIZATION PROCESS

In accordance with another aspect of the instant invention, the suspensions of viable sporulated oocysts of *Eimeria tenella* obtained in accordance with my new production method were found to be efficacious and reliable for producing immunization of chickens against cecal coccidiosis by establishing a controlled subclinical coccidial infection when administered orally at levels of approximately 100–800 sporulated oocysts per bird. These suspensions were found to be especially adapted to the safe, economical, and effective immunization of large flocks of chickens.

The chickens are preferably treated at an early age so that they will acquire immunity before a natural outbreak of cecal coccidiosis might occur. It is advantageous to administer the inoculum of sporulated oocysts to the chickens individually or in the feed or water of a flock. Thus, chicks at one day or older can be inoculated orally by merely dropping a measured amount of the vaccine in the back of the mouth of each bird or inoculating into the crop. This method has the advantage of ensuring uniform inoculation. However, it is sometimes more convenient to administer the vaccine in the feed or drinking water, and when this is to be done it is preferable to wait until the chickens have learned to eat so that each bird will consume the inoculum. For instance, to administer the sporulated oocysts to a flock of 1000 chickens at a calculated dosage level of 200 sporulated oocysts per chicken, the following procedure can be used. Four ml. of inoculum consisting of a suspension of 200,000 sporulated oocysts of *Eimeria tenella* in 1–4 percent aqueous potassium dichromate solution, obtained by the method described hereinabove, is mixed into two quarts of water and this diluted suspension is added to about 2000–3000 g. of dry poultry feed to make approximately 4000–5000 g. of wet mash. This wet mash is then fed to the chickens after they have been starved overnight or for several hours to ensure good eating and thus uniform inoculation. This illustrative procedure, which is of course based on the provision of an average of 4–5 g. of wet mash per chicken, can be varied appropriately when the food consumption per chicken is likely to be more or less than the 4–5 g. portion. Alternatively, the 4 ml. inoculum of the foregoing illustrative procedure and a small amount of a suitable suspending agent are mixed with about 10 quarts of the drinking water of the 1000-bird flock. As the suspending agent, I ordinarily prefer to employ about 0.02–0.05 percent by weight of magnesium aluminum silicate gel (Veegum, R. T. Vanderbilt Co., Inc.) in the water.

Following ingestion of the inoculum, the chickens will experience one cycle of light infection, during which they will not develop symptoms of cecal coccidiosis, but they will develop sufficient immunity to protect them against an amount of inoculum that will ordinarly kill 10–20 percent of non-immunized controls. The first cycle in the birds is completed by the sixth to tenth day after the inoculation, during which millions of non-sporulated oocysts are passed in the droppings and subsequently sporulate in the litter. Some of these sporulated oocysts are ingested by the chickens, which then go through a second cycle of infection. Generally, the second cycle of infection is severe enough to induce solid, life-long immunity. During this second infection, the partial immunity of the birds is sufficient to prevent mortality. Third and fourth cycles of infection will afford additional immunity to birds not solidly immune after the second cycle of infection.

In field trials simulating commercial poultry raising operations, losses from cecal coccidiosis averaged less than 0.5 percent during the immunization period when the foregoing procedure was employed. Moreover, the chickens were immunized without appreciable weight loss during the immunization. To ensure a minimum of adverse effect by the second infection, an anticoccidial drug can be administered in the feed at a subcurative dosage level which permits completion of the development of immunity.

After completion of the second cycle of infection, about 95 percent or more of the chickens will have acquired sufficient immunity to withstand amounts of *Eimeria tenella* which the birds may encounter in nature. A third cycle of the parasite may develop in the chickens, and after completion of this cycle, or by the time the birds are 28 days of age, over 99 percent of the inoculated flock will have solid immunity. After the first cycle of infection, several cycles may occur concomitantly, since the birds pick up infective oocysts from the litter.

Results of an illustrative series of oral inoculations with the product obtained by my new method are shown below in Table V.

of non-immunized controls were inoculated with a challenge dose of 100,000 sporulated oocysts of *Eimera*

TABLE V.—PRODUCTION OF IMMUNITY TO CECAL COCCIDIOSIS IN YOUNG CHICKENS

| Number of birds [1] | Replicates | Oocyst per bird at age [2]— | | Age in days at challenge | Challenge dose per bird | Average weight at [3]— | | Percentage mortality from challenge |
|---|---|---|---|---|---|---|---|---|
| | | 3 days | 13 days | | | Challenge | 7 days | |
| 10 | 4 | | | | None | 155 | 240 | |
| 10 | 4 | | | 13 | 15,000 | 156 | 205 | 20.0 |
| 10 | 4 | 200 | | | None | 146 | 260 | |
| 10 | 4 | 200 | | 13 | 15,000 | 148 | 216 | 5.0 |
| 10 | 4 | 400 | | | None | 142 | 218 | |
| 10 | 4 | 400 | | 13 | 15,000 | 143 | 213 | 0 |
| 11 | 2 | | | | None | 286 | 429 | |
| 11 | 2 | | | 24 | 100,000 | 283 | 384 | 27.3 |
| 11 | 2 | 200 | 200 | | None | 270 | 407 | |
| 11 | 2 | 200 | 200 | 24 | 100,000 | 290 | 417 | 0 |
| 11 | 2 | 400 | 400 | | None | 279 | 428 | |
| 10 | 2 | 400 | 400 | 24 | 100,000 | 284 | 426 | 0 |
| 10 | 1 | | | | None | 140 | 223 | |
| 10 | 1 | | | 13 | 50,000 | 139 | 158 | 60.0 |
| 10 | 1 | 800 | | | None | 134 | 209 | |
| 10 | 1 | 800 | | 13 | 50,000 | 153 | 227 | 0 |

[1] New Hampshire-White Plymouth Rock crosses, mixed sexes randomized into groups at 3 days of age.
[2] Inoculated orally by pipette.
[3] Weights are sex weighted.

The doses of 200 and 400 sporulated oocysts of *Eimeria tenella* to the birds at three days of age had slight or no effect on their growth, causing no visible hemorrhage, and resulted in immunity which protected the birds from the challenge doses that killed 10–20 percent of the non-immunized controls. Two cycles of infection, 100 to 400 sporulated oocysts followed by 100–2000 sporulated oocysts ten days later, resulted in immunity sufficient to protect the birds against a challenge dose that killed 25–50 percent of non-immunized controls and retarded growth of control survivors significantly.

Results of representative field trials with six flocks of broiler strain New Hampshire and Vantress Crosses orally inoculated through feeding the product obtained by my new method are summarized below in Table VI.

TABLE VI.—FIELD TRIALS ON THE IMMUNIZATION OF BROILER FLOCKS AGAINST CECAL COCCIDIOSIS

| Flock No. | Number of birds | Mortality before inoculation | | Mortality to 28 days | | Mortality during immunization period, 3rd to 28th day of age | |
|---|---|---|---|---|---|---|---|
| | | No. | Percent | No. | Percent | No. | Percent |
| 1 | 7,140 | 48 | 0.67 | 61 | 0.85 | 13 | 0.18 |
| 2 | 7,140 | 112 | 1.57 | 121 | 1.69 | 9 | 0.13 |
| 3 | 3,060 | 7 | 0.23 | 51 | 1.67 | 44 | 1.44 |
| 4 | 2,754 | 14 | 0.51 | 47 | 1.71 | 33 | 1.20 |
| 5 | 4,080 | 44 | 1.08 | 55 | 1.35 | 11 | 0.27 |
| 6 | 2,040 | 3 | 0.15 | 15 | 0.74 | 12 | 0.59 |
| Total | 25,514 | 228 | .89 | 350 | 1.37 | 122 | 0.48 |

The housing and management rating of these flocks and the rating of the flocks at market time are shown below.

| Flock No. | Housing and management rating | Rating of flock at market time | |
|---|---|---|---|
| | | Growth | Feed conversion |
| 1 | Good | Excellent | Excellent. |
| 2 | Average | Good | Good. |
| 3 | Poor | Excellent | Excellent. |
| 4 | Fair | Good | Good. |
| 5 | Average | do | Excellent. |
| 6 | Good | do | Do. |

It is evident from Table VI that mortality from all causes through the 28th day of age was not excessive, being less than 2 percent in any flock, and of the 0.48 percent of birds which died, only one bird was determined to have died of cecal coccidiosis. When the chickens were 28 days of age, 15 birds were picked at random from each immunized flock and these birds and an equal number of non-immunized controls were inoculated with a challenge dose of 100,000 sporulated oocysts of *Eimera tenella* per bird. The results are shown below in Table VII.

TABLE VII.—CHALLENGE OF IMMUNIZED AND NON-IMMUNIZED CHICKENS WITH A DOSE OF 100,000 SPORULATED OOCYSTS OF *EIMERIA TENELLA*

| Flock Number | No. and mortality of challenged birds | | | |
|---|---|---|---|---|
| | Vaccinated | | Controls | |
| | No. | Percent | No. | Percent |
| 1 | 15 | 0 | 15 | 53.3 |
| 2 | 15 | 0 | 15 | 60.0 |
| 3 | 15 | 0 | 15 | 60.0 |
| 4 | 15 | 0 | 15 | 26.7 |
| 5 | 15 | 0 | 15 | 66.7 |
| 6 | 15 | 0 | 15 | 40.0 |
| Total | 90 | 0 | 90 | 51.1 |

As can be seen in Table VII, none of the birds from the immunized flocks died, and none of them exhibited clinical symptoms of cecal coccidiosis. In contrast, an average of over 50 percent of the non-immunized controls died; all of these birds bled profusely and the survivors exhibited typical symptoms of acute cecal coccidiosis.

If it is desired to administer one or more of the conventional coccidiostatic drugs used in the poultry industry during the immunization process, it is necessary, as will be readily appreciated, that the dosage of the drug be at a subcurative level, so that the infection can progress to the desired extent and produce immunity in the chickens. And for best results, the administration of the coccidiostatic drug usually should be commenced three or four to twelve days after the immunizing oral inoculum is administered. When the coccidiostatic drug has its primary activity against schizonts of *Eimeria tenella*, it can be administered continuously from the time of oral inoculation with the infective dose of sporulated oocysts of *Eimeria tenella* or can be started as late as twelve days after the inoculation, in anticipation of the effects of the second cycle of infection. For example, any of the usual coccidiostatic agents can be employed in medicated feed or water in subcurative coccidiostatic amount, as illustrated by use of one of the following agents in the indicated percentage by weight in poultry feed, or at one-half of the indicated percentage by weight in water: 0.0125 percent of sulfaquinoxaline; 0.0125 percent nitrophenide; 0.0055 percent of nitrofurazone; 0.0028 percent of nitrofurazone and 0.00044 percent of furazolidone; 0.5 percent of 4,5-imidazoledicarboxamide; 0.1 percent of a mixture of 25 percent of 3,5-dinitrobenzamide, 30 percent of acetyl-(para-nitrophenyl)-sulfanilamide and, optionally, 5 percent of 3 - nitro - 4 - hydroxyphenylarsonic acid, the balance being inert diluent; 0.2 percent of a mixture of 15 percent of acetyl-(para-nitrophenyl)sulfanilamide, 10 percent of dibutyltin dilaurate, 10 percent of dinitrodiphenylsulfonylethylenediamine and either 3.75 percent or 1.25 percent of 3-nitro-4-hydroxyphenylarsonic acid, the balance being inert diluent; 0.003–0.0125 percent of 1-(4-amino-2 - n - propyl - 5 - pyrimidylmethyl)-2-methylpyridinium chloride hydrochloride; 0.05 percent of 3,5-dinitro-ortho-toluamide; 0.05 percent of arsenosobenzene; and 0.0031 percent of the molecular complex of 4,4'-dinitrocarbanilide and 2-hydroxy-4,6-dimethylpyrimidine.

When 4,6 - diamino-4-(4-methylmercaptophenyl) - 1,2-dihydro-2,2-dimethyl-1,3,5 - triazine hydrochloride (also known as methiotriazamine) or 2,2'-thiobis (4,6-dichlorophenol) (also known as bithionol) or mixtures of the two, are employed in subcurative coccidiostatic amount, for instance, 0.025–0.125 percent by weight of a mixture of methiotriazamine and bithionol in 1:5 weight ratio, in the poultry feed, it is preferred for best results to begin administration of the drug after the oral inoculation with sporulated oocysts of *Eimeria tenella*.

This application is a continuation-in-part of my copending application Serial No. 814,658, filed May 21, 1959, now abandoned, which is a continuation-in-part of my prior application Serial No. 358,959, filed June 1, 1953, and now abandoned.

I claim:

1. The method which comprises the steps of: infecting a healthy, disease-free chicken one day to twelve weeks of age by inoculation with an oral dose of viable sporulated oocysts of *Eimeria tenella* in which the number of said viable sporulated oocysts is approximately 100–300 for a chicken one day old and is increased with increasing age and weight of the chicken to a maximum of approximately 40,000 for a chicken twelve weeks old and weighing approximately five pounds; harvesting during the period from 144 hours to 288 hours after the inoculation the oocysts of *Eimeria tenella* produced by the infection by periodically collecting the moist fresh cecal droppings from the infected chicken over a period of up to 96 hours beginning 144–192 hours after the inoculation; mixing the harvested oocysts, within approximately four hours after collection thereof, with a one to four percent aqueous potassium dichromate solution and removing coarse insoluble particles of debris from the suspensions of oocysts thus obtained; aerating the oocysts, beginning within approximately eighteen hours after their collection, in a one to four percent aqueous potassium dichromate solution at a temperature in the approximate range 19–37° C., thereby causing sporulation of the oocysts; washing the sporulated oocysts with one to four percent aqueous potassium dichromate solution; and recovering the sporulated oocysts of *Eimeria tenella* thus produced.

2. The method which comprises the steps of: infecting a healthy, disease-free chicken one day to twelve weeks of age by inoculation with an oral dose of viable sporulated oocysts of *Eimeria tenella* in which the number of said oocysts is approximately 100–300 for a chicken one day old and is increased with the increasing age and weight of the chicken to a maximum of approximately 40,000 for a chicken twelve weeks old and weighing approximately five pounds; harvesting during the period from 144 hours to 288 hours after the inoculation the oocysts of *Eimeria tenella* produced by the infection by periodically collecting the moist fresh cecal droppings from the infected chicken over a period of up to 96 hours beginning 144–192 hours after the inoculation and mixing the harvested oocysts, within approximately four hours after collection thereof, with a one to four percent aqueous potassium dichromate solution, and further harvesting by collecting the oocysts from the cecal pouches of the infected chicken by sacrificing the chicken 156–288 hours after the inoculation, removing and opening the cecal pouches of the chicken, and washing the contents of said cecal pouches with and into a one to four percent aqueous potassium dichromate solution; removing coarse insoluble particles of debris from the suspensions of oocysts in one to four percent aqueous potassium dichromate solution thus obtained; aerating the oocysts, beginning within approximately eighteen hours after their collection, in a one to four percent aqueous potassium dichromate solution at a temperature in the approximate range 19–37° C., thereby causing sporulation of the oocysts; washing the sporulated oocysts with one to four percent aqueous potassium dichromate solution; and recovering the sporulated oocysts of *Eimeria tenella* thus produced.

3. The method which comprises the steps of: infecting a healthy, disease-free chicken four to five weeks of age and weighing approximately 0.75–1.75 pounds by inoculation with an oral dose of viable sporulated oocysts of *Eimeria tenella* in which the number of said viable sporulated oocysts is approximately 1000–2000; harvesting during the period from 144 hours to 288 hours after the inoculation the oocysts of *Eimeria tenella* produced by the infection by periodically collecting the moist fresh cecal droppings from the infected chicken over a period of up to 96 hours beginning 144–192 hours after the inoculation; mixing the harvested oocysts, within approximately two hours after collection thereof, with a one to four percent aqueous potassium dichromate solution and removing coarse insoluble particles of debris from the suspension of oocysts thus obtained; aerating the oocysts, beginning within approximately four hours after their collection, in a one to four percent aqueous potassium dichromate solution at a temperature in the approximate range 19–37° C., thereby causing sporulation of the oocysts; washing the sporulated oocysts with one to four percent aqueous potassium dichromate solution; and recovering the sporulated oocysts of *Eimeria tenella* thus produced.

4. The method which comprises the steps of: infecting a healthy, disease-free chicken four to five weeks of age and weighing approximately 0.75–1.75 pounds by inoculation with an oral dose of viable sporulated oocysts of *Eimeria tenella* in which the number of said viable sporulated oocysts is approximately 1000–2000; harvesting during the perior from 144 hours to 288 hours after the inoculation the oocysts of *Eimeria tenella* produced by the infection by periodically collecting the moist fresh cecal droppings from the infected chicken over a period of up to 96 hours beginning 144–192 hours after the inoculation and mixing the harvested oocysts, within approximately two hours after collection thereof, with a one to four percent aqueous potassium dichromate solution, and further harvesting by collecting the oocysts from the cecal pouches of the infected chicken by sacrificing the chicken 156–288 hours after the inoculation, removing and opening the cecal pouches of the chicken, and washing the contents of said cecal pouches with and into a one to four percent aqueous potassium dichromate solution; removing coarse insoluble particles of debris from the suspensions of oocysts in one to four percent aqueous potassium dichromate solution thus obtained; aerating the oocysts, beginning within approximately four hours after their collection, in a one to four percent aqueous potassium dichromate solution at a temperature in the approximate range 19–37° C., thereby causing sporulation of the oocysts; washing the sporulated oocysts with one to four percent aqueous potassium dichromate solution; and recovering the sporulated oocysts of *Eimeria tenella* thus produced.

5. The process for immunizing chickens susceptible to infection by *Eimeria tenella* against cecal coccidiosis by establishing a controlled subclinical coccidial infection which comprises the step of feeding the chickens an oral inoculum of approximately 100–800 viable sporulated oocysts of *Eimeria tenella* per chicken, said viable sporulated oocysts being obtained in accordance with the method claim 1.

6. The process for immunizing chickens susceptible to infection by *Eimeria tenella* against cecal coccidiosis by establishing a controlled subclinical coccidial infection which comprises a step of concurrently feeding to the chickens an oral inoculum of approximately 100–800 viable sporulated oocysts of *Eimeria tenella* per chicken, said viable sporulated oocysts being obtained in accordance with the method of claim 1, and a subcurative amount per chicken of a coccidiostatic drug.

7. The process for immunizing chickens susceptible to infection by *Eimeria tenella* against cecal coccidiosis by establishing a controlled subclinical coccidial infection which comprises the step of concurrently feeding to the chickens an oral inoculum of approximately 100–800 viable sporulated oocysts of *Eimeria tenella* per chicken, said viable sporulated oocysts being obtained in accordance with the method of claim 1, and a subcurative amount per chicken of a mixture of 4,6-diamino-1-(4-methylmercaptophenyl) - 1,2 - dihydro - 2,2 - dimethyl - 1,3,5-triazine hydrochloride and 2,2'-thiobis(4,6-dichlorphenol).

References Cited in the file of this patent

Corvallis: "A Factor in Delayed Production of *Eimeria Tenella* Oocysts," Poultry Science, vol. 25, No. 4, pp. 391–392, July 1946.

Corvallis: "Coccidial Immunity Studies in Chickens, I," Poultry Science, vol. 30, No. 1, pp. 76–80, 1951.

Corvallis: "Coccidial Immunity Studies in Chickens, II," Poultry Science, vol. 33, No. 3, pp. 596–601, 1954.

Edgar et al.: "Control of Avian Coccidiosis Through Breeding or Immunization," Poultry Science, vol. 30, No. 6, page 911, 1951.

Chandler: "On the Control of Caecal Coccidiosis in Chickens," Technical Bulletin No. 127, July 1932, Michigan State College Agricultural Experiment Station, East Lansing, Michigan, pages 4, 5, 11, 12, 19, 21, 22, 23.

Uricchio: "The Feeding of Artificially Altered Oocysts of *Eimeria Tenella* as a Means of Establishing Immunity to Cecal Coccidiosis in Chickens," Proc. Helminthological Society, Wash., D.C., vol. 20, No. 2, pp. 77–83, July 1953.

Soulsby: "Some Immunological Phenomena in Parasite Infections," The Veterinary Record, vol. 69, pp. 1129–1139, Dec. 7, 1957.

Gordeuk et al.: "The Effect of Age of Bird and Degree of Exposure in the Development of Immunity to Cecal Coccidiosis in Chicks," Poultry Science, vol. 30, No. 4, pp. 503–508, 1951.

Brackett et al.: "The Relative Susceptibility of Chickens of Different Ages to Coccidiosis Caused by *Eimeria Necatrix*," Poultry Science, vol. 30, No. 1, pp. 146–148, 1952.

Champion: "The Inheritance of Resistance to *Eimeria Tenella* in the Domestic Fowl," Poultry Science, vol. 31, No. 5, page 911, 1952.

Gardiner et al.: "The Coccidiostatic Action of Nitrophenide on *Eimeria Tenella*," Jl Parasitology, vol. 38, No. 6, pp. 517–524, 1952.

Kendall et al.: "Relationships Between Sulphamezathine Therapy and the Acquisition of Immunity to *Eimeria Tenella*," J. Comp. Path., vol. 62, pp. 116–124, 1952.

Uricchio: "Destruction of Coccidial Oocysts of Chickens by Means of Chemicals," Experimental Parasitology, vol. 2, No. 1, pp. 16–18, 1953.

UNITED STATES PATENT OFFICE
CERTIFICATE OF CORRECTION

Patent No. 3,147,186                            September 1, 1964

Samuel Allen Edgar

It is hereby certified that error appears in the above numbered patent requiring correction and that the said Letters Patent should read as corrected below.

Column 1, lines 43 and 44, for "attempest" read -- attempts --; column 3, line 70, for "There" read -- These --; column 6, line 29, for "40000" read -- 4000 --; lines 61 and 62, for "supension" read -- suspension --; column 7, line 12, for "lift" read -- life --; line 68, for "114-" read -- 144- --; column 11, line 59, for "dichlorate" read -- dichromate --; column 14, TABLE II, fourth column, last line thereof, for "48,000" read -- 84,000 --; column 16, lines 27 and 34, for "pounches", each occurrence, read -- pouches --; columns 15 and 16, TABLE IV, heading to second column, after "inoculated" insert -- per --; same columns, same TABLE IV, fifth column, second line thereof, for "26.6" read -- 26.1 --; column 23, line 5, after "method" insert -- of --.

Signed and sealed this 23rd day of March 1965.

(SEAL)
Attest:

ERNEST W. SWIDER                            EDWARD J. BRENNER
Attesting Officer                             Commissioner of Patents